US011635518B2

(12) United States Patent
Ujihara et al.

(10) Patent No.: US 11,635,518 B2
(45) Date of Patent: Apr. 25, 2023

(54) MEASUREMENT APPARATUS AND MEASUREMENT METHOD USING A LASER AND BEAT SIGNALS

(71) Applicant: Mitutoyo Corporation, Kanagawa (JP)

(72) Inventors: Hiroki Ujihara, Ibaraki (JP); Yoshimasa Suzuki, Ibaraki (JP); Shinichi Hara, Ibaraki (JP)

(73) Assignee: Mitutoyo Corporation, Kanagawa (JP)

( * ) Notice: Subject to any disclaimer, the term of this patent is extended or adjusted under 35 U.S.C. 154(b) by 352 days.

(21) Appl. No.: 16/887,941

(22) Filed: May 29, 2020

(65) Prior Publication Data
US 2020/0379112 A1 Dec. 3, 2020

(30) Foreign Application Priority Data
May 29, 2019 (JP) .............................. JP2019-100619

(51) Int. Cl.
*G01S 17/34* (2020.01)
*G01S 7/481* (2006.01)
*G01S 7/48* (2006.01)
*G01B 9/02003* (2022.01)

(52) U.S. Cl.
CPC .......... *G01S 17/34* (2020.01); *G01B 9/02003* (2013.01); *G01S 7/4808* (2013.01); *G01S 7/4814* (2013.01)

(58) Field of Classification Search
CPC ...... G01S 17/34; G01S 7/4808; G01S 7/4814; G01S 7/4911; G01S 7/4915; G01S 7/4812; G01B 9/02003
See application file for complete search history.

(56) References Cited

U.S. PATENT DOCUMENTS 11,255,969 B2 * 2/2022 Komatsuzaki ........ G01S 7/4915

FOREIGN PATENT DOCUMENTS

JP         3583906         8/2004

OTHER PUBLICATIONS

Takefumi Hara: "Distance Sensing by FSL Laser and its Application"; OPTONEWS; vol. 7, No. 3; 2012; with English-language translation of the relevant section; 10 pgs.

* cited by examiner

*Primary Examiner* — Hwa Andrew Lee
(74) *Attorney, Agent, or Firm* — Oblon, McClelland, Maier & Neustadt, L.L.P.

(57) ABSTRACT

A measurement apparatus, including: a laser apparatus that outputs a frequency-modulated laser beam with a plurality of modes; a branching part that branches the frequency-modulated laser beam into a reference light and a measurement light; a beat signal generation part that generates a plurality of beat signals by mixing the reference light and a reflected light that is reflected by radiating the measurement light onto an object to be measured; a conversion part that converts the plurality of beat signals into digital signals by sampling the beat signals at a frequency greater than or equal to four times a resonator frequency of the laser resonator; and a calculation part that calculates a distance from the measurement apparatus to the object to be measured on the basis of the digital signals is provided.

10 Claims, 10 Drawing Sheets

MEASUREMENT APPARATUS AND MEASUREMENT METHOD USING A LASER AND BEAT SIGNALS

CROSS-REFERENCE TO RELATED APPLICATIONS

The present application claims priority to Japanese Patent Application number 2019-100619, filed on May 29, 2019. The contents of this application are incorporated herein by reference in their entirety.

BACKGROUND OF THE INVENTION

A frequency-shifted feedback laser (FSFL) which is provided with a frequency shifter in a resonator and outputs a plurality of longitudinal-mode lasers whose oscillation frequencies vary linearly with time is known. Also, an optical distance meter using such an FSFL is known (see, e.g., Patent Document 1, the Specification of Japanese Patent. No. 3583906, and Non-Patent Document 1, "Distance Sensing by FSF Laser and Its Application," by Takefumi HARA, Optonews, Vol. 7, No. 3, 2012, pp. 25-31).

An optical distance meter using a frequency-shifted feedback laser (FSFL) can acquire a large amount of three-dimensional information in a contactless manner, and has been used, for example, in design and production sites. In such an optical distance meter, electric noise may be generated in a light receiving device, a measurement circuit, and the like, and superimposed on an electrical signal, which causes a reduction in measurement accuracy. Conventionally, results of a plurality of measurements are averaged in order to prevent the reduction of the measurement accuracy, but there have been problems that this causes an increase in the measurement time and a reduction in throughput.

BRIEF SUMMARY OF THE INVENTION

The present invention focuses on these points, and an object of the invention is to suppress a reduction of measurement accuracy while shortening the measurement time of an optical distance meter with a simple configuration.

A first aspect of the present invention provides a measurement apparatus for measuring a distance to an object to be measured, the measurement apparatus includes: a laser apparatus that has a laser resonator and outputs a frequency-modulated laser beam with a plurality of modes; a branching part that branches a portion of the frequency-modulated laser beam output by the laser apparatus as a reference light and at least some of the remaining portion of the frequency-modulated laser beam as a measurement light; a beat signal generation part that generates a plurality of beat signals by mixing the reference light and a reflected light that is reflected by radiating the measurement light onto an object to be measured; a conversion part that converts the plurality of beat signals into digital signals by sampling the beat signals at a frequency greater than or equal to four times a resonator frequency of the laser resonator and a calculation part that calculates a distance from the measurement apparatus to the object to be measured on the basis of the digital signals.

A second aspect of the present invention provides a measurement method of a measurement apparatus for measuring a distance to an object to be measured, the method includes the steps of: outputting a frequency-modulated laser beam with a plurality of modes from a laser apparatus having a laser resonator; branching a portion of the frequency-modulated laser beam as a reference light and at least some of the remaining portion of the frequency-modulated laser beam as a measurement light; generating a plurality of beat signals by mixing the reference light and a reflected light that is reflected by radiating the measurement light onto an object to be measured; converting the plurality of beat signals into digital signals by sampling the beat signals at a frequency greater than or equal to four times a resonator frequency of the laser resonator; and calculating a distance from the measurement apparatus to the object to be measured on the basis of the digital signals.

DETAILED DESCRIPTION OF THE INVENTION

Hereinafter, the present invention will be described through exemplary embodiments of the present invention, but the following exemplary embodiments do not limit the invention according to the claims, and not all of the combinations of features described in the exemplary embodiments are necessarily essential to the solution means of the invention.

[Configuration Examples of the Measurement Apparatus 100]

Figure 1:
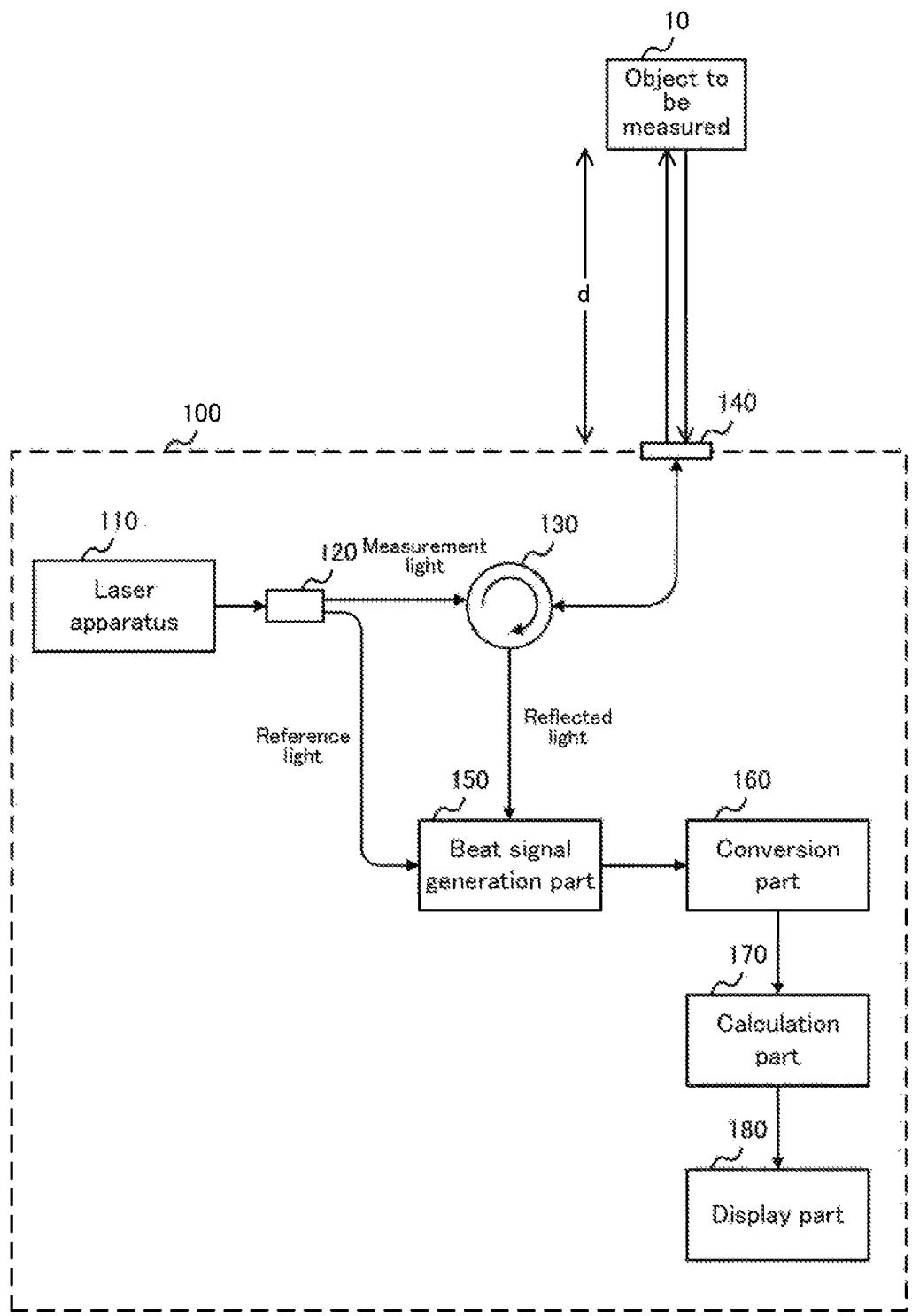
FIG. 1 shows a configuration example of a measurement apparatus 100 according to the present embodiment together with an object to be measured 10.

FIG. 1 shows a configuration example of a measurement apparatus 100 according to the present embodiment together with an object to be measured 10. The measurement apparatus 100 optically measures a distance between the measurement apparatus 100 and the object to be measured 10. Also, the measurement apparatus 100 may measure the three-dimensional shape of the object to be measured 10 by scanning a position of the laser beam radiated onto the object to be measured 10. The measurement apparatus 100 includes a laser apparatus 110, a branching part 120, an optical circulator 130, an optical head part 140, a beat signal generation part 150, a conversion part 160, a calculation part 170, and a display part 180.

The laser apparatus 110 has a laser resonator and outputs a frequency-modulated laser beam with a plurality of modes. The laser apparatus 110 is provided with a frequency shifter in a resonator, and outputs a plurality of longitudinal mode lasers whose oscillation frequencies change linearly with the passage of time. The laser apparatus 110 is, for example, a frequency-shifted feedback laser (FSFL). The FSFL will be described later.

The branching part 120 branches the frequency-modulated laser beam output from the laser apparatus 110, with a portion of it as a reference light and at least some of the remaining portion of it as a measurement light. The branching part 120 is, for example, a one-in-two-out fiber optic coupler. In the example of FIG. 1, the branching part 120 supplies the measurement light to the optical circulator 130 and supplies the reference light to the beat signal generation part 150.

The optical circulator 130 has a plurality of input/output ports. For example, the optical circulator 130 outputs a light, which is input form one port, to the next port, and further outputs a light, which is input from the next port, to the port after next. FIG. 1 shows the example in which the optical circulator 130 has three input/output ports. In this case, the optical circulator 130 outputs the measurement light supplied from branching part 120 to the optical head part 140. Also, the optical circulator 130 outputs a light input from the optical head part 140 to the beat signal generation part 150.

The optical head part 140 radiates the light input from the optical circulator 130 toward the object to be measured 10. The optical head part 140 includes, for example, a collimator lens. In this case, the optical head part 140 first adjusts the light input from the optical circulator 130 via an optical fiber into a beam shape using the collimator lens, and then outputs the light.

Also, the optical head part 140 receives a reflected light of the measurement light radiated onto the object to be measured 10. The optical head part 140 focuses the received reflected light onto the optical fiber with a collimator lens and supplies it to the optical circulator 130. In this case, the optical head part 140 may include one common collimator lens, and the collimator lens may irradiate the object to be measured 10 with the measurement light, and may receive the reflected light from the object to be measured 10. The distance between the optical head part 140 and the object to be measured 10 is defined as d.

Alternatively, the optical head part 140 may include a condenser lens. In this case, the optical head part 140 focuses the light input from the optical circulator 130 via the optical fibers on the surface of the object to be measured 10. The optical head part 140 receives at least a part of the reflected light reflected on the surface of the object to be measured 10. The optical head part 140 focuses the received reflected light onto an optical fiber using the condenser lens and supplies the light to the optical circulator 130. Also in this case, the optical head part 140 may include one common condenser lens, and that condenser lens may irradiate the object to be measured 10 with the measurement light and receive the reflected light from the object to be measured 10.

The beat signal generation part 150 receives, from the optical circulator 130, the reflected light that is the measurement light radiated onto and reflected from the object to be measured 10. Also, the beat signal generation part 150 receives the reference light from the branching part 120. The beat signal generation part 150 mixes the reflected light and the reference light to generate a beat signal. The beat signal generation part 150 includes, for example, a photoelectric conversion element, converts the beat signal into an electrical signal, and outputs the electrical signal.

Here, since the reflected light has traveled back and forth across the distance from the optical head part 140 to the object to be measured 10, a difference in a propagation distance corresponding to at least the distance 2d occurs as compared with the reference light. Since the oscillation frequency of the light output from the laser apparatus 110 changes linearly with the passage of time, a frequency difference, dependent on a propagation delay corresponding to the difference in the propagation distance, occurs in the oscillation frequencies of the reference light and the reflected light. The beat signal generation part 150 generates a beat signal corresponding to such a frequency difference.

The conversion part 160 converts the beat signal generated by the beat signal generation part 150 into a digital signal. Also, the conversion part 160 performs frequency conversion of the converted digital signal to detect the frequency of the beat signal. Here, the frequency of the beat signal is defined as $v_B$.

The calculation part 170 detects a difference of propagation distance between the reference light and the measurement light based on the conversion result of the conversion part 160. The calculation part 170 calculates the distance d from the optical head part 140 to the object to be measured 10 on the basis of the frequency $v_B$ of the beat signals.

The display part 180 displays a calculation result of the calculation part 170. The display part 180 may include a display or the like to display the calculation result. Also, the display part 180 may store the calculation result in a storage unit or the like. The display part 180 may supply the calculation result to an external device via a network or the like.

The measurement apparatus 100 described above can measure the distance d between the measurement apparatus 100 and the object to be measured 10 by analyzing the frequency difference between the reflected light of the measurement light radiated onto the object to be measured 10 and the reference light. That is, the measurement apparatus 100 can form a non-contact and non-destructive optical distance meter. Next, a more detailed configuration of the measurement apparatus 100 will be described.

[Configuration Example of the Laser Apparatus 110]

Figure 2:
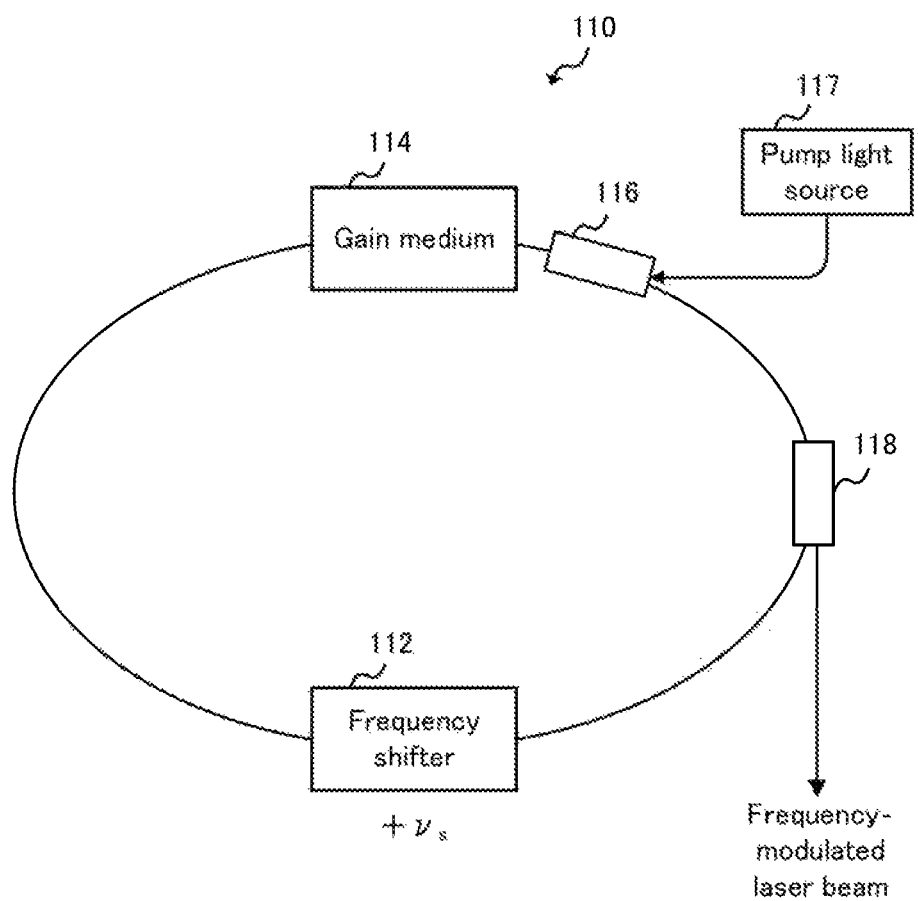
FIG. 2 shows a configuration example of a laser apparatus 110 according to the present embodiment.

FIG. 2 shows a configuration example of the laser apparatus 110 according to the present embodiment. The laser apparatus 110 of FIG. 2 shows an example of the FSFL. The laser apparatus 110 includes a laser resonator and oscillates a laser beam in the laser resonator. The laser resonator of the laser apparatus 110 includes a laser resonator including a frequency shifter 112, again medium 114, a WDM coupler 116, a pump light source 117, and an output coupler 118.

The frequency shifter 112 shifts a frequency of a light to be input by an approximately constant frequency. The frequency shifter 112 is, for example, an acousto-optic frequency shifter (AOFS) having acousto-optic elements. Here, an amount of the frequency shift by the frequency shifter 112 is defined as $+v_s$. That is, the frequency shifter 112 shifts the frequency of the light circulating around the resonator to increase the frequency by $v_s$ for each round.

The gain medium 114 is supplied with a pump light and amplifies the input light. The gain medium 114 is, for example, an optical fiber doped with impurities. The impurities are, for example, rare earth elements such as erbium, neodymium, ytterbium, terbium, thulium, or the like. The gain medium 114 is supplied with the pump light from the pump light source 117 via the WDM coupler 116. The output coupler 118 outputs, to an external device, a part of the light that has been laser oscillated in the resonator.

That is, the laser apparatus 110 shown in FIG. 2 contains a fiber ring laser having the frequency shifter 112 in the resonator. The laser apparatus 110 preferably further includes an isolator in the resonator. Also, the laser apparatus 110 may have an optical bandpass filter that passes light of a predetermined wavelength band in the resonator. Frequency characteristics of the laser beam output from the laser apparatus 110 will be described below.

Figure 3:
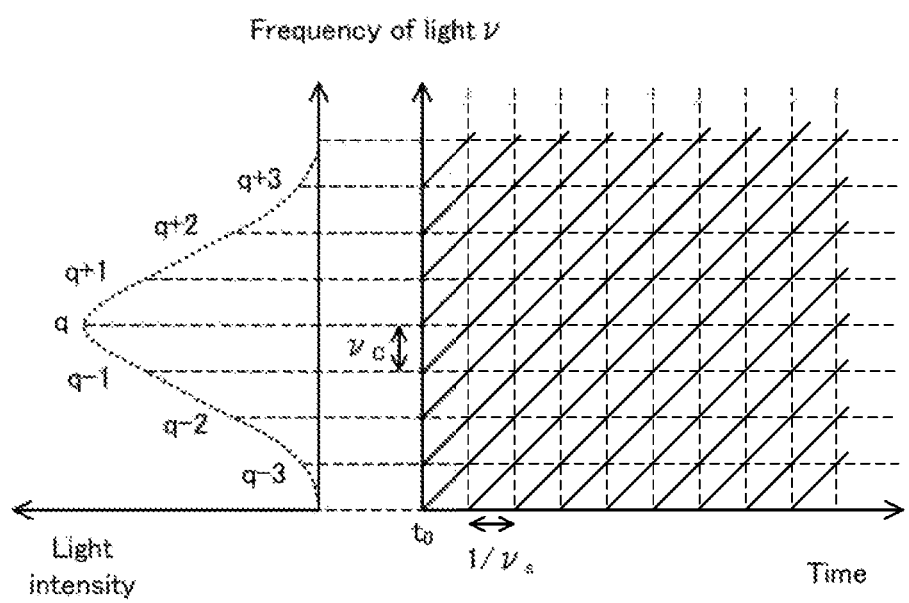
FIG. 3 shows an example of a laser beam output from the laser apparatus 110 according to the present embodiment.

FIG. 3 shows an example of the laser beam output from the laser apparatus 110 according to the present embodiment. FIG. 3 shows, on the left, a light spectrum of the laser beam output by the laser apparatus 110 at the time $t_0$. In the light spectrum, the horizontal axis indicates the light intensity, and the vertical axis indicates the frequency of light. Also, a plurality of longitudinal modes of the light spectrum are denoted by the numbers q. The frequencies of the plurality of longitudinal modes are arranged at approximately constant frequency intervals. Supposing that $\tau_{RT}(=1/v_c)$ denotes the time for light to go around the resonator, the plurality of longitudinal modes are arranged at intervals of $1/\tau_{RT}(=v_c)$, as represented by the following equation. It should be noted that, $v_c$ is the initial frequency of the light spectrum at the time $t_0$. In addition, $v_c$ is the resonance frequency $v_c$ of the laser resonator.

$$v_q = (t_0) = v_0 + \frac{q}{\tau_{RT}} \quad \text{[Equation 1]}$$

FIG. 3 shows, on the right, changes in frequencies with the passage of time of the plurality of longitudinal modes output by the laser apparatus 110. On the right side of FIG. 3, the horizontal axis indicates the time and the vertical axis indicates the frequency. That is, FIG. 3 shows a change over time in the frequency of the laser beam output from the laser apparatus 110 on the right side, and shows an instantaneous frequency of the laser beam at the time to on the left side.

In the laser apparatus 110, each time the light in the resonator goes around the resonator, the frequency shifter 112 increases the frequency of the light traveling around the resonator by $v_s$. That is, since the frequency of each of the modes increases by $v_s$ for every passing of $\tau_{RT}$, the rate of change of frequency dv/dt (i.e. chirp rate) becomes approximately equal to $v_s/\tau_{RT}$. Therefore, the plurality of longitudinal modes represented by Equation 1 change as shown in the following equation with the passage of the time t.

$$v_q(t) = v_0 + \frac{v_s}{\tau_{RT}} t + \frac{q}{\tau_{RT}} \quad \text{[Equation 2]}$$

[Details of a Distance Measurement Process]

The measurement apparatus 100 according to the present embodiment measures the distance d between the optical head part 140 and the object to be measured 10 by using the laser apparatus 110 that outputs the frequency elements represented by Equation 2. Suppose that an optical path difference between the reference light and the reflected light is only the distance 2d, which is the reciprocated distance d, and the propagation delay corresponding to the distance 2d is Δt. That is, when the measurement light is reflected and returned from the object to be measured 10 at the time t, the frequency of the returned reflected light approximately matches the past frequency that is a time Δt earlier than the time t, and therefore can be expressed by the following equation.

$$v_q(t - \Delta t) = v_0 + \frac{v_s}{\tau_{RT}}(t - \Delta t) + \frac{q}{\tau_{RT}} \quad \text{[Equation 3]}$$

On the other hand, the reference light at the time t can be expressed by the following equation in a similar manner as with Equation 2, where the reference light is $v_{q'}(t)$.

$$v_{q'}(t) = v_0 + \frac{v_s}{\tau_{RT}} t + \frac{q'}{\tau_{RT}} \quad \text{[Equation 4]}$$

Because the beat signal generation part 150 superimposes the reflected light and the reference light, a plurality of beat signals between the plurality of longitudinal modes expressed by Equation 3 and the plurality of longitudinal modes expressed by Equation 4 are generated. Supposing that the frequencies of such beat signals are $v_B(m, d)$, $v_B(m, d)$ can be expressed by the following equation from Equations 3 and 4, where m is an interval of the longitudinal mode numbers (=q−q') and Δt=2d/c.

$$v_B(m, d) = v_{q'}(t) - v_q(t - \Delta t) = \frac{v_s}{\tau_{RT}} \cdot \frac{2d}{c} - \frac{m}{\tau_{RT}} \quad \text{[Equation 5]}$$

From Equation 5, the distance d is expressed by the following equation, where $1/\tau_{RT}=v_c$.

$$d = \frac{c}{2v_s v_c} \{v_B(m, d) + mv_c\} \quad \text{[Equation 6]}$$

From Equation 6, it can be understood that the distance d can be calculated from a frequency observation result of the beat signal by determining the interval m of the longitudinal mode numbers. It should be noted that the interval m can be determined by detecting a change in beat signals when the amount of frequency shift $v_s$ of the laser apparatus 110 is changed. Since such a method of determining the interval m is known, as described in Patent Document 1 or the like, its detailed description is omitted.

Since the observed beat signal is always a positive frequency, in calculation, the beat signal generated on the negative frequency side is folded back on the positive side and observed as an image signal. Next, the generation of such an image signal will be described.

Figure 4:
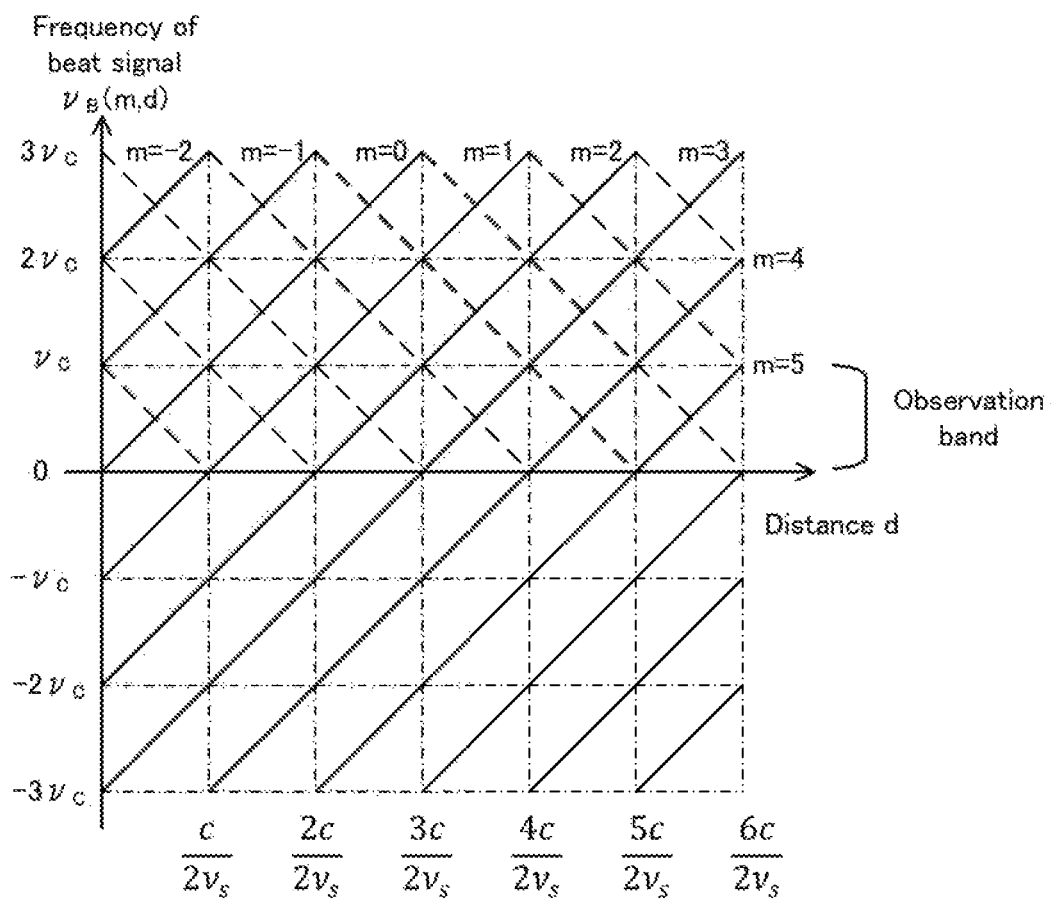
FIG. 4 shows an example of a relationship between (i) a frequency of the beat signal detected by the measurement apparatus 100 according to the present embodiment and (ii) a distance d between an optical head part 140 and the object to be measured 10.

FIG. 4 shows an example of the relationship between the frequency of the beat signal detected by measurement apparatus 100 according to the present embodiment and the distance d between the optical head part 140 and the object to be measured 10. In FIG. 4, the horizontal axis indicates the distance d, and the vertical axis indicates the frequency $v_B(m, d)$ of the beat signal. The plurality of straight lines shown by the solid lines in FIG. 4 are graphs showing the relation of the frequency $v_B(m, d)$ of the beat signal with respect to the distance d for each of the plurality of values of m, as shown in Equation 5.

As shown in FIG. 4, a plurality of beat signals corresponding to the value of m are generated. However, since the plurality of longitudinal modes included in each of the reflected light and the reference light are arranged at approximately constant frequency intervals $v_c$, a plurality of beat signals having equal values of m are superimposed on the approximately same frequency on the frequency axis. For example, when a frequency band between frequencies 0 and $v_c$ is observed, a plurality of beat signals are superimposed on approximately the same frequency and are observed as a single line spectrum.

In addition, the absolute value of the frequency $v_B(m, d)$ of the beat signal in the negative range smaller than 0 is further observed as the image signal. That is, the graph of the region in which the vertical axis of FIG. 4 is smaller than 0 is folded back with a frequency 0 as a boundary. FIG. 4 shows the folded image signal by a plurality of dotted lines. Since only the positive and negative signs of the folded image signals are inverted, the image signals are superimposed on the observed frequency axis at the same frequency as the absolute value of the frequency before being folded. For example, when a frequency band between frequencies 0 and $v_c$ is observed, the beat signal and the image signal are respectively located at different frequencies unless the frequencies of the beat signal and the image signal become $v_c/2$.

As described above, in the observation band between the frequencies 0 and $v_c$, two line spectra are generated, which are (i) the beat signal $v_B(m, d)$ and (ii) the image signal $v_B(m', d)$ whose value of m is different from that of the beat signal $v_B(m, d)$. Here, as an example, m'=m+1. In this case, the beat signal generation part 150 can cancel such an image signal by using a quadrature detection. Next, the beat signal generation part 150 and the conversion part 160 using the quadrature detection will be described.

Figure 5:
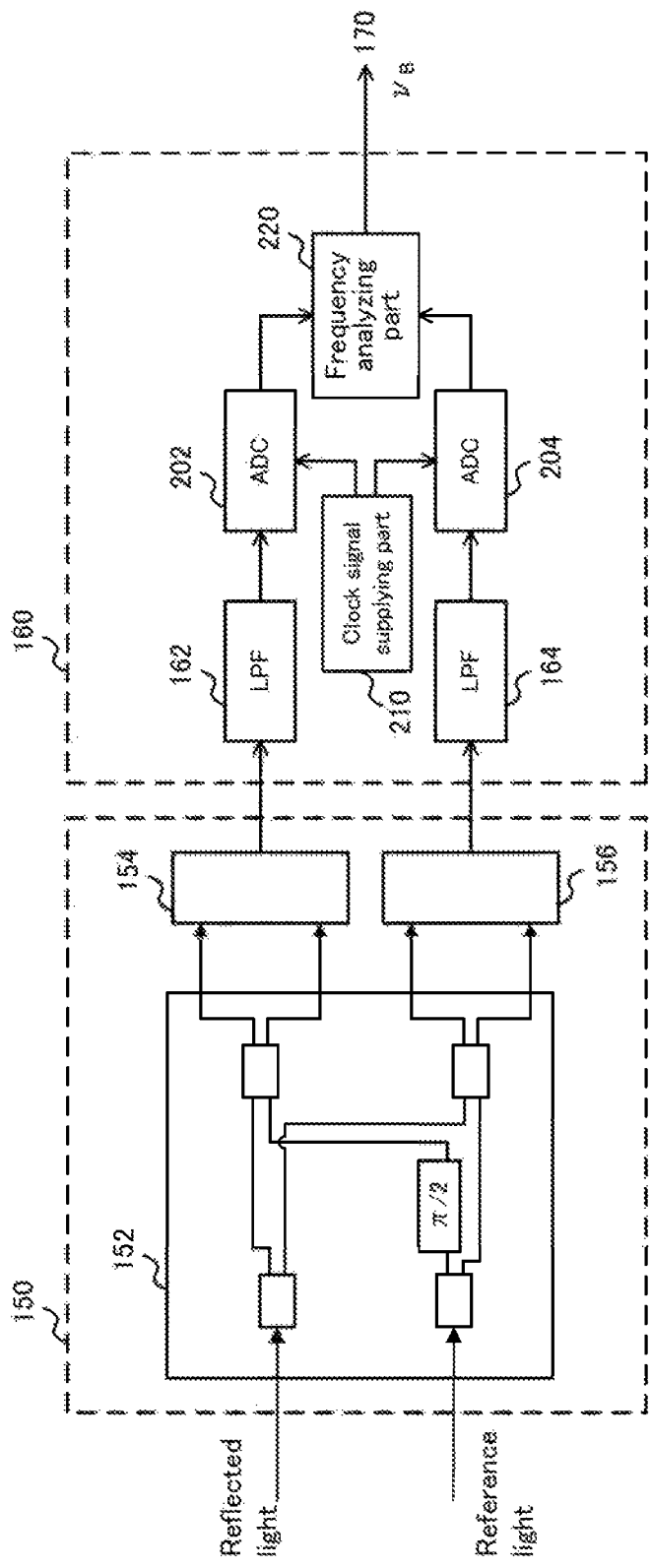
FIG. 5 shows a configuration example of a beat signal generation part 150 and a conversion part 160 according to the present embodiment.

FIG. 5 shows a configuration example of the beat signal generation part 150 and the conversion part 160 according to the present embodiment. The beat signal generation part 150 quadrature-detects the reflected light and the reference light. The beat signal generation part 150 includes an optical 90-degree hybrid 152, a first photoelectric conversion part 154, and a second photoelectric conversion part 156.

The optical 90-degree hybrid 152 respectively branches the input reflected light and the input reference light into two. The optical 90-degree hybrid 152 multiplexes one of the branched reflected lights and one of the branched reference lights with an optical coupler or the like to generate the first beat signal. The optical 90-degree hybrid 152 multiplexes the other branched reflected light and the other branched reference light with the optical coupler or the like to generate the second beat signal. Here, the optical 90-degree hybrid 152 generates a beat signal after generating a phase difference of 90 degrees between the two branched reference lights. For example, the optical 90-degree hybrid 152 multiplexes the branched reflected light with one of the branched reference light and multiplexes the branched reflected light with a light generated by the other branched reference light passing through a π/2 wavelength plate.

The first photoelectric conversion part 154 and the second photoelectric conversion part 156 receive the multiplexed reflected light and reference light and convert them into electrical signals. Each of the first photoelectric conversion part 154 and the second photoelectric conversion part 156 may be a photodiode or the like. Each of the first photoelectric conversion part 154 and the second photoelectric conversion part 156 is, for example, a balanced photodiode. In FIG. 5, suppose that the first photoelectric conversion part 154 generates a first beat signal and the second photoelectric conversion part 156 generates a second beat signal. As described above, the beat signal generation part 150 performs the quadrature detections by multiplexing two reference lights and two reflected lights having phases differing by 90 degrees, respectively, and outputs two beat signals to the conversion part 160.

The conversion part 160 performs a frequency analysis on the two beat signals. Here, an example in which the conversion part 160 performs the frequency analysis using the first beat signal as an I signal and the second beat signal as a Q signal will be described. The conversion part 160 includes a first filter part 162, a second filter part 164, a first AD converter 202, a second AD converter 204, a clock signal supplying part 210, and a frequency analyzing part 220.

The first filter part 162 and the second filter part 164 reduce signal components in a frequency band differing from a frequency band that a user or the like wants to analyze. Here, the frequency band that the user or the like wants to analyze is set from 0 to $v_c$. The first filter part 162 and the second filter part 164 are, for example, low-pass filters that pass signal components having a frequency equal to or less than $v_c$. In this case, the first filter part 162 supplies the first beat signal obtained by reducing the signal components having a frequency higher than the frequency $v_c$ to the first AD converter 202. Also, the second filter part 164 supplies the second beat signal obtained by reducing the signal components having a frequency higher than the frequency $v_c$ to the second AD converter 204.

The first AD converter 202 and the second AD converter 204 convert analog signals into digital signals. For example, the first AD converter 202 converts the first beat signal into a digital signal, and the second AD converter 204 converts the second beat signal into a digital signal. The clock signal supplying part 210 supplies clock signals to the first AD converter 202 and the second AD converter 204. By doing this, the first AD converter 202 and the second AD converter 204 convert the analog signals into the digital signals at approximately the same sampling rate as a clockfrequency of the received clock signal.

Here, when the observation band is from 0 to $v_c$, the frequency of the beat signals is at most the resonator frequency $v_c$ of the laser resonator. Therefore, the clock signal supplying part 210 supplies clock signals having a frequency greater than or equal to twice the resonator frequency $v_c$ of the laser resonator to the first AD converter 202 and the second AD converter 204, whereby the beat signals can be observed.

The frequency analyzing part 220 converts the first beat signal and the second beat signal into frequency data. As an example, the frequency analyzing part 220 performs a digital Fourier transform (DFT) on the first beat signal and the second beat signal. The frequency analyzing part 220 adds the first beat signal converted into the frequency data as the real part and the second beat signal converted into the frequency data as the imaginary part, and cancels the image signal. It should be noted that after the beat signals are converted into the digital signals, the conversion part 160 may configure the frequency analyzing part 220 using an integrated circuit or the like. The quadrature detection in the beat signal generation part 150 and the frequency analysis in the conversion part 160 will be described below.

Figure 6:
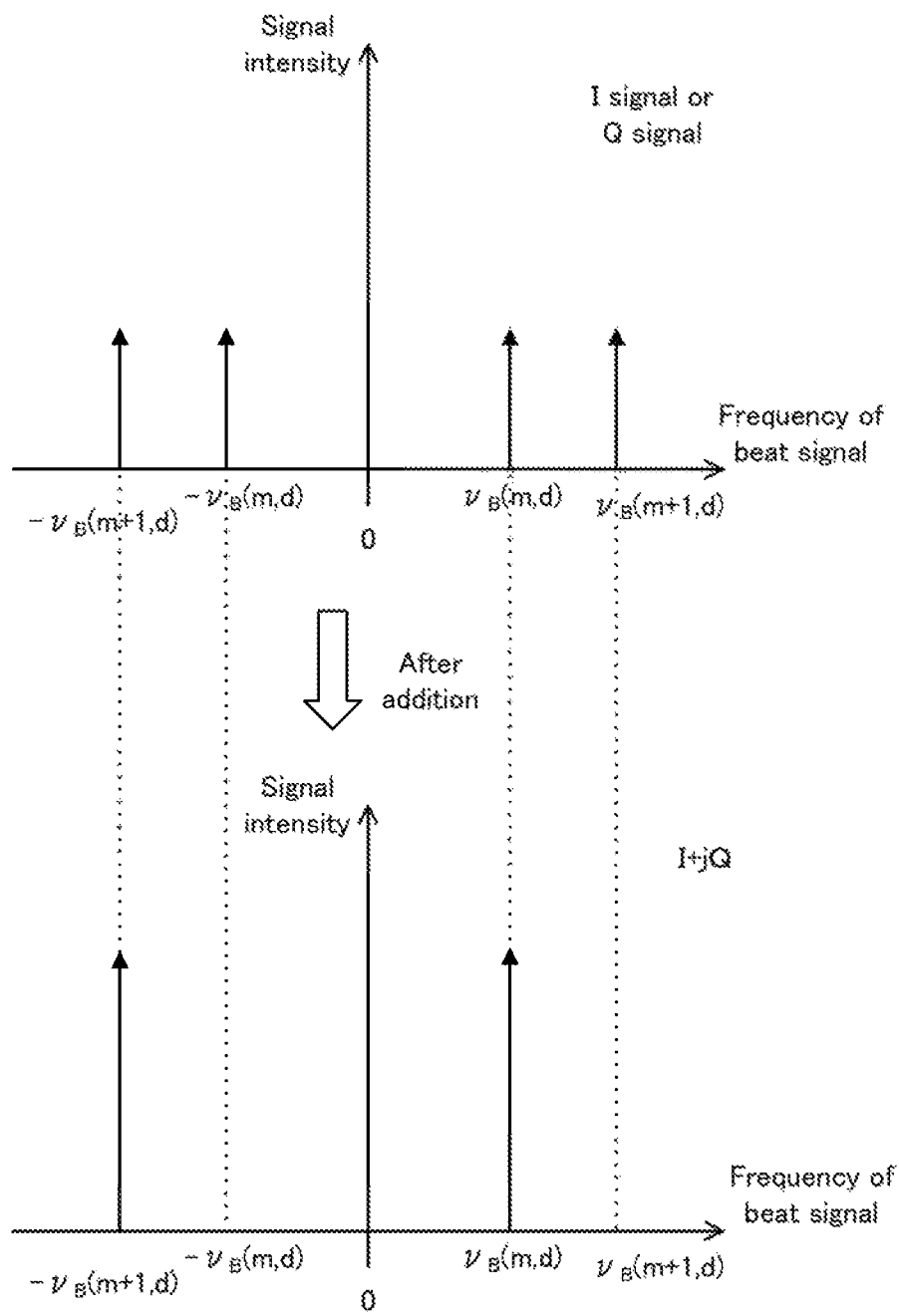
FIG. 6 shows an example of an outline of a quadrature detection by the beat signal generation part 150 and the conversion part 160 according to the present embodiment.

FIG. 6 shows an example of an outline of quadrature detection by the beat signal generation part 150 and the conversion part 160 according to the present embodiment. In FIG. 6, the horizontal axis indicates the frequency of the beat signal, and the vertical axis indicates the signal intensity. FIG. 6 shows a frequency spectrum of one of the I signal and the Q signal. The frequency spectra of both the I and Q signals have approximately the same spectral shape, as shown in the upper part of FIG. 6. In the I signal and the signal Q, for example, a beat signal $v_B(m, d)$ and an image signal $v_B(m+1, d)$ are observed in a frequency band between the frequencies 0 and $v_c$. In this case, in the I and Q signals, a beat signal $-v_B(m, d)$ and an original beat signal $-v_B(m+1, d)$ of the image signal exist in a frequency band between the frequencies 0 and $-v_c$ on the negative side.

Here, since the I signal and the Q signal are signal components being quadrature-detected by the beat signal generation part 150, they include different phase information even if the spectral shapes are the same. For example, in the frequency band between the frequencies 0 and $v_c$ on the positive side, phases of the image signal $v_B(m+1, d)$ of the I signal and the image signal $v_B(m+1, d)$ of the Q signal are mutually inverted. Similarly, in the frequency band between the frequencies 0 and $-v_c$ on the negative side, phases of the beat signal $-v_B(m, d)$ of the I signal and the beat signal $-v_B(m, d)$ of the Q signal are mutually inverted.

Therefore, as shown in the lower part of FIG. 6, when the frequency analyzing part 220 calculates I+jQ using the I signal and the Q signal, the beat signals of the frequency $v_B(m, d)$ strengthen each other and the image signals of the frequency $v_B(m+1, d)$ cancel each other out in the frequency band between the frequencies 0 and $v_c$. Similarly, in the frequency band between the frequencies 0 and $-v_c$, the beat signals of the frequency $-v_B(m+1, d)$ strengthen each other and the beat signals of the frequency $-v_B(m, d)$ cancel each other out.

According to the frequency analysis result of the frequency analyzing part 220, one beat signal is observed for the frequency $v_B(m, d)$ in the frequency band between the frequencies 0 and $v_c$. Since the measurement apparatus 100 can cancel out the image signal in this manner, the frequency $v_B(m, d)$ of the beat signal can be detected. For example, the frequency analyzing part 220 outputs, as the frequency $v_B(m, d)$ of the beat signal, a frequency at which the signal intensity of the converted frequency signal is highest.

Here, the distance d measured by the measurement apparatus 100 is expressed by Equation 6. From Equation 6, it can be seen that the distances d can be calculated by using three frequencies $v_c$, $v_s$, and $v_B(m, d)$. Among the three frequencies, $v_B(m, d)$ can be detected as described above. Also, since $v_c$ and $v_s$ are the frequencies determined based on components used in the laser apparatus 110, $v_c$ and $v_s$ can be treated as fixed values. Therefore, the calculation part 170 calculates the distance d using the frequency $v_B(m, d)$ of the beat signal detected by the conversion part 160 and the predetermined $v_c$ and $v_s$.

As described above, the measurement apparatus 100 can measure the distance d from the optical head part 140 to the object to be measured 10. In the measurement apparatus 100 such as above, measurement accuracy may be reduced because electrical noise may be superimposed in light-receiving devices such as the first photoelectric conversion part 154 and the second photoelectric conversion part 156 and in measurement circuits such as the beat signal generation part 150 and the conversion part 160. In order to prevent such reduction of measurement accuracy, it is conceivable to average the results of multiple measurements, but that would increase the measurement time and may cause a reduction in the throughput.

[Multiple Beat Signals]

The measurement apparatus 100 according to the present embodiment expands an observation band for beat signals to measure a plurality of beat signals generated in a plurality of different bands. As shown in FIG. 4, the beat signal generation part 150 mixes the reflected light and the reference light to generate a plurality of beat signals $v_B(m, d)$ of different mode numbers m. Therefore, by expanding the observation band for the beat signals $v_B(m, d)$ of the conversion part 160, the beat signals $v_B(m, d)$ generated at different frequencies can be observed.

Figure 7:
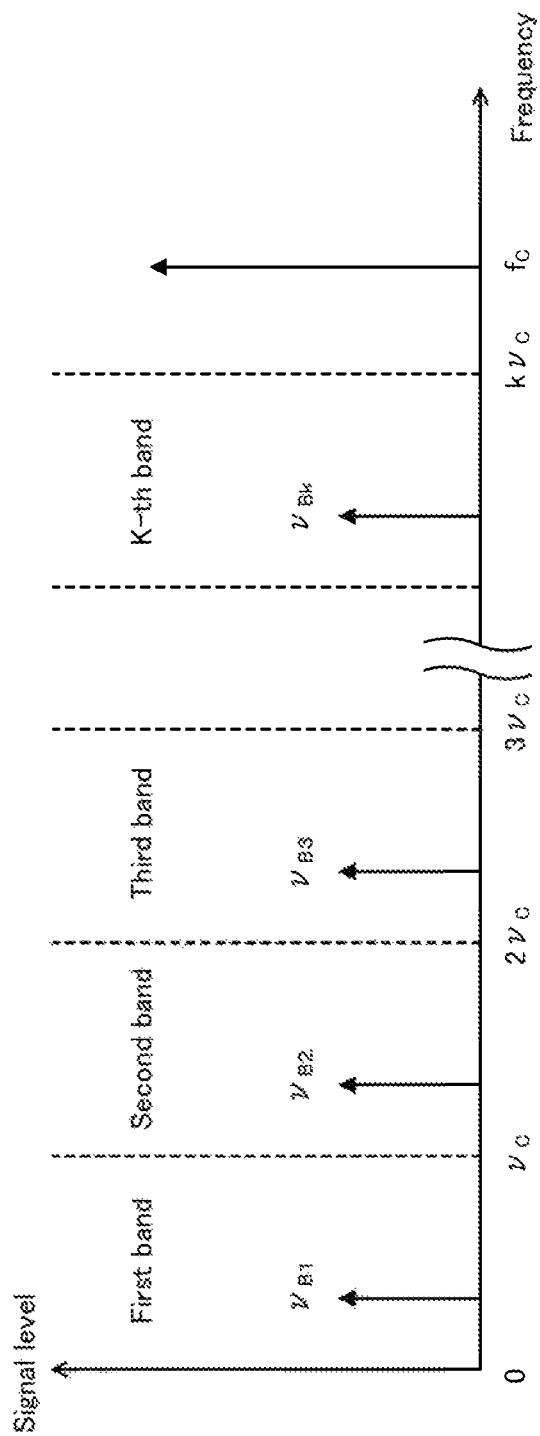
FIG. 7 shows an example of frequency information which the conversion part 160 according to the present embodiment outputs.

FIG. 7 shows an example of frequency information output by the conversion part 160 according to the present embodiment. The frequency information represents information indicating signal frequencies and signal levels corresponding to the respective signal frequencies. In FIG. 7, the horizontal axis indicates the frequency, and the vertical axis indicates the signal level. FIG. 7 shows a plurality of beat signals after a plurality of image signals have been cancelled by the quadrature detection. The beat signals are observed in the following manner one beat signal for each of the plurality of bands whose bandwidths approximately correspond to the resonator frequency $v_c$. Here, the plurality of bands are defined as the rust band, the second band, . . . , and the k-th band, in the ascending order of frequency, and the frequency of the beat signal in the first band is defined as $v_{B1}$, the frequency of the beat signal in the second band is defined as $v_{B2}$, and the frequency of the beat signal in the k-th band is defined as $v_{Bk}$.

When the measurement apparatus 100 observes k beat signals from the first to the k-th beat signals, the observation band is $k \times v_c$. In this case, the clock signal supplying part 210 may supply clock signals having a frequency equal to or more than $2k \times v_c$ to the first AD converter 202 and the second AD converter 204. It can be seen that in order for the measurement apparatus 100 to observe two or more beat signals, at least the clock signals need to have a frequency that is greater than or equal to four times the resonator frequency $v_c$.

As shown in FIGS. 3 and 4, the plurality of beat signals are generated at corresponding frequency positions in respective bands. For example, in an ideal case such as when the distance d between the measurement apparatus 100 and the object to be measured 10 is constant and noise superimposed on an electrical signal is negligibly small, the frequency $v_{Bk}$ of the k-th beat signal approximately matches the frequency $v_{B1}$ of the first beat signal when subtracted by $(k-1) \times v_c$. In this manner, ideally, the plurality of beat signals are generated at approximately constant intervals of the frequency $v_c$.

Therefore, the measurement apparatus 100 frequency-shifts the plurality of beat signals by the corresponding frequency intervals, converts the beat signals into signal components in the same frequency band, and then averages the signal components, thereby reducing the influence of noise. Next, the measurement apparatus 100 will be described.

[Configuration Example of the Conversion Part 160 and the Calculation Part 170]

Figure 8:
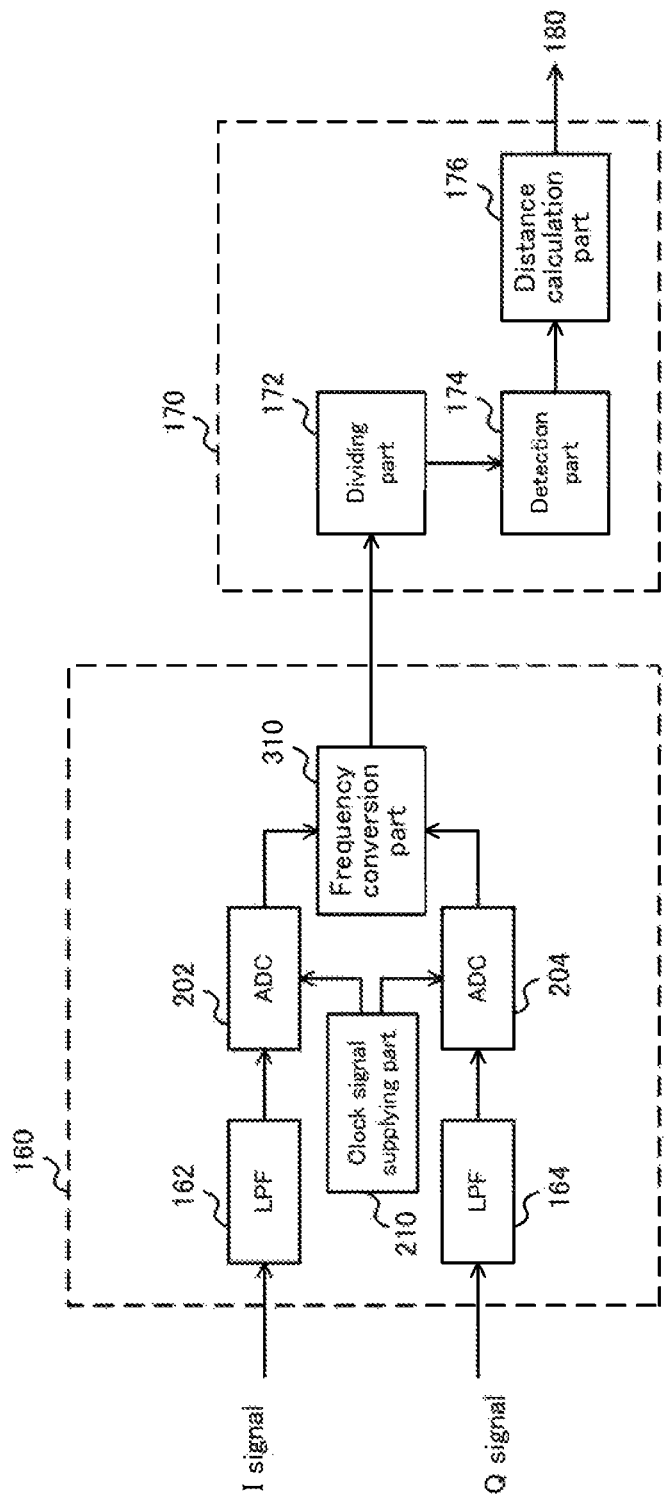
FIG. 8 shows a configuration example of the conversion part 160 and a calculation part 170 provided in the measurement apparatus 100 according to the present embodiment.

FIG. 8 shows a configuration example of the conversion part 160 and the calculation part 170 provided in the measurement apparatus 100 according to the present embodiment. Since the conversion part 160 shown in FIG. 8 has the same configuration as that of the conversion part 160 described in FIG. 5, the same reference numerals are assigned to components having approximately the same operations as in the conversion part 160, and descriptions thereof are omitted. The conversion part 160 and the calculation part 170 shown in FIG. 8 are configured so that the measurement apparatus 100 has an observation band of $2 \times v_c$ or more.

The conversion part 160 samples a plurality of beat signals at a frequency greater than or equal to four times the resonator frequency $v_c$ of the laser resonator and converts the beat signals into digital signals. That is, the clock signal supplying part 210 supplies a clock signal having a frequency greater than or equal to four times the resonant frequency $v_c$ of the laser resonator to the first AD converter 202 and the second AD converter 204. The first AD converter 202 and the second AD converter 204 respectively convert analog signals into the I and Q signals which are the digital signals including a plurality of beat signals and a plurality of image signals. Since the conversion part 160 samples the plurality of beat signals at the frequency greater than or equal to four times the resonator frequency $v_c$ of the laser resonator and converts the beat signals into the digital signals, the observation band for the beat signals is expanded four times or more. As a result, digital signals including four or more measurement results of the distance d can be obtained from one detection result of the beat signals.

It should be noted that the first filter part 162 and the second filter part 164 pass signal components in a frequency band which is greater than or equal to twice the resonator frequency $v_c$. For example, the clock signal supplying part 210 outputs a clock signal having a frequency equal to or more than $2k \times v_c$, and the first filter part 162 and the second filter part 164 pass signal components in a frequency band from 0 to $k \times v_c$.

The conversion part 160 includes a frequency conversion part 310. The frequency conversion part 310 converts the I and Q signals, which are the digital signals, into frequency information. The frequency conversion part 310 converts the digital signals into frequency information using, for example, a digital Fourier transform or the like. The frequency conversion part 310 calculates I+jQ using the converted I and Q signals, and outputs a calculation result obtained by canceling out the image signals.

The calculation part 170 calculates the distance d from the measurement apparatus 100 to the object to be measured 10 on the basis of the frequency data of the digital signals converted by the frequency conversion part 310. The calculation part 170 includes a dividing part 172, a detection part 174, and a distance calculation part 176.

The dividing part 172 divides the frequency information converted by the frequency conversion part 310 into frequency information corresponding to a plurality of bands having a predetermined bandwidth. For example, suppose that the dividing part 172 divides the frequency information into first frequency information and second frequency information. The first frequency information includes (i) a portion of the signal frequency indicated by the frequency information before the division and (ii) a signal level corresponding to this signal frequency. The second frequency information includes (i) the remaining portion of the signal frequency indicated by the frequency information before the division and (ii) a signal level corresponding to this remaining portion of the signal frequency. The division performed by the dividing part 172 corresponds to creating the above-mentioned first frequency information and second frequency information.

The dividing part 172 sets the predetermined bandwidth to a bandwidth equal to or less than the resonator frequency $v_c$. As an example, as shown in the example of FIG. 8, the dividing part 172 divides the frequency information by a bandwidth that approximately matches the resonator frequency $v_c$. For example, supposing that the frequency of the clock signal which the clock signal supplying part 210 outputs is 2f, the dividing part 172 divides the frequency information by an integer k which is the largest integer below $f_c/v_c$.

The detection pan 174 detects frequency positions of the beat signals for each of the plurality of pieces of divided frequency information. The detection part 174 detects, for example, frequency positions at which signal levels are maximized in respective bands, and sets the detected frequency positions to the frequencies $v_{B1}, v_{B2}, \ldots, v_{Bk}$ of the plurality of beat signals.

The distance calculation part 176 calculates the distance d from the measurement apparatus 100 to the object to be measured 10 on the basis of the detected frequency positions of the plurality of beat signals. For example, the distance calculation part 176 respectively calculates the distances d from the measurement apparatus 100 to the object to be measured 10 corresponding to the frequency positions of the plurality of beat signals.

In this case, the distance calculation part 176 calculates a distance $d_1$ from the measurement apparatus 100 to the object to be measured 10 corresponding to the frequency $v_{B1}$. In addition, the distance calculation part 176 calculates a distance $d_2$ corresponding to a frequency $(v_{B2}-v_c)$ obtained by subtracting $v_c$ from the frequency $v_{B2}$. Similarly, the distance calculation part 176 calculates a distance $d_k$ corresponding to a frequency $[v_{Bk}-(k-1) \times v_c]$ obtained by subtracting $(k-1) \times v_c$ from the frequency $v_{Bk}$.

Then, the distance calculation part 176 averages the calculated distances. The distance calculation part 176 outputs, for example, a value obtained by averaging the distances $d_1, d_2, \ldots, d_k$ as the distance d. As a result, even if electric noise generated in the light receiving devices, the measurement circuits, and the like is superimposed on an electrical signal, since the measurement results of a plurality of distances d are averaged, the measurement apparatus 100 can reduce the influence of the noise.

In addition, since the measurement apparatus 100 detects the plurality of beat signals by expanding the measurement band, it is possible to acquire the calculation results of a number of distances d larger than the number of measurement times of the measurement beam. For example, the measurement apparatus 100 can calculate average value of the measured results of a predetermined number of distances d from the detected results of one beat signal. Therefore, the measurement apparatus 100 can improve the throughput by shortening the measurement time while improving measurement accuracy.

In the measurement apparatus 10 according to the present embodiment, the example in which the calculation part 170 averages the calculation results of the plurality of distances d has been described, but the invention is not limited to this. The measurement apparatus 100 may calculate the distance d after averaging corresponding frequencies of the beat signals.

In this case, the distance calculation part 176 converts the corresponding frequency positions of the plurality of beat signals detected by the detection part 174. The distance calculation part 176 converts the corresponding frequency positions $v_{B1}, (v_{B2}-v_c), \ldots, [v_{Bk}-(k-1) \times v_c]$ in the observation band between the frequencies 0 and $v_c$ using, for example, the frequencies $v_{B1}, v_{B2}, \ldots, v_{Bk}$ of the plurality of beat signals.

Then, the distance calculation part 176 averages the converted frequency positions, and calculates a distance d, which is from the measurement apparatus 100 to the object to be measured 10, corresponding to the averaged frequency positions. Even in such case, even if electric noise generated in the light receiving devices, the measuring circuits, and the like is superimposed on an electrical signal, the measurement apparatus 100 averages the detected results of different beat signals, therefore the measurement apparatus 100 can reduce the influence of noise.

In the measurement apparatus 100 according to the present embodiment, the examples in which the calculation part 170 averages the calculation results of the distances d or the detected results of the beat signals have been described above, but the present embodiment is not limited to these. The measurement apparatus 100 may divide the spectra of the beat signal to generate multiple divided spectra, superimpose the multiple divided spectra, and calculate the distances d on the basis of the superimposed spectra. Next, such a measurement apparatus 100 will be described.

[Variation Example of the Conversion Part 160 and the Calculation Part 170]

Figure 9:
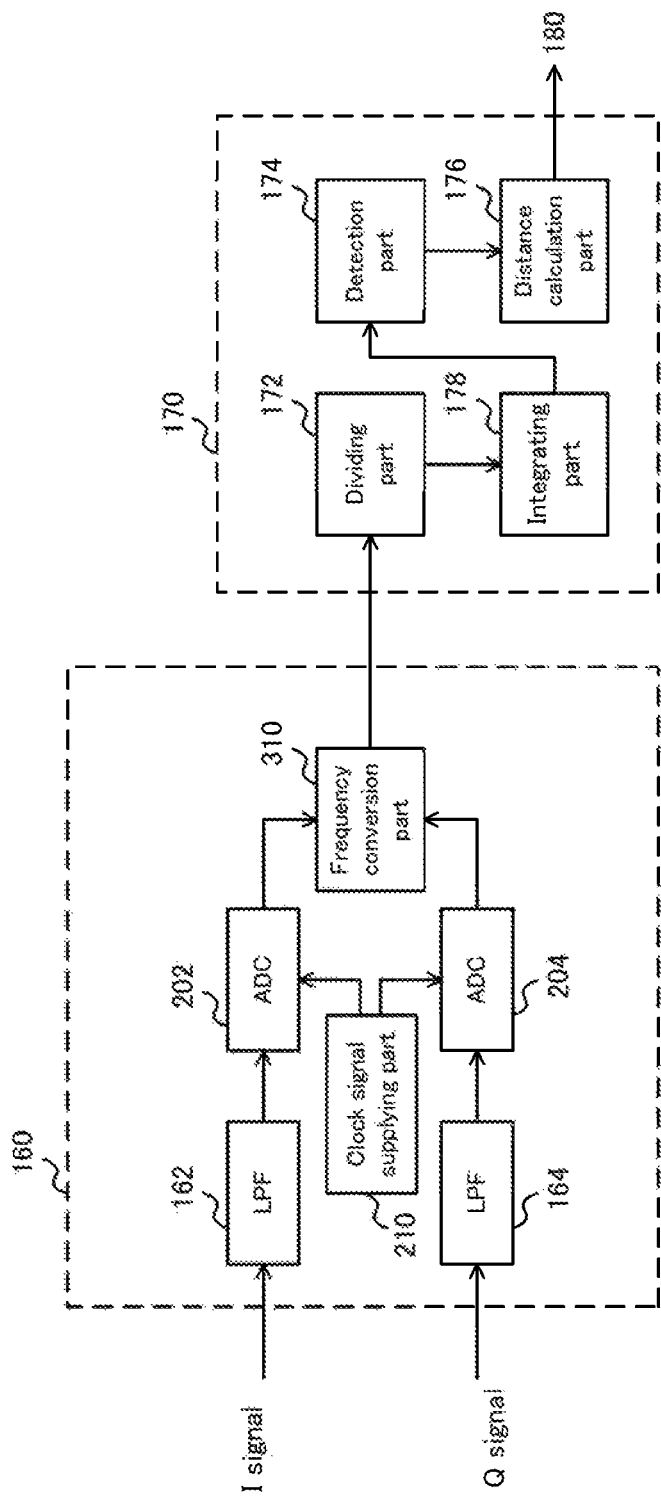
FIG. 9 shows a variation example of the conversion part 160 and the calculation part 170 provided in the measurement apparatus 100 according to the present embodiment.

FIG. 9 shows a Variation Example of the conversion part 160 and the calculation part 170 provided in the measurement apparatus 100 according to the present embodiment. Since the conversion part 160 and the calculation part 170 shown in FIG. 9 have the same configurations as the conversion part 160 and the calculation part 170 described in FIG. 7, the same reference numerals are given to components having approximately the same operations, and a description thereof is omitted. The calculation part 170 of the Variation Example includes a dividing part 172, an integrating part 178, a detection part 174, and a distance calculation part 176.

The dividing part 172 divides the frequency information converted by the frequency conversion part 310 into frequency information corresponding to a plurality of bands having a predetermined bandwidth. For example, as shown in FIG. 7, the dividing part 172 divides the frequency information into frequency information corresponding to k bands such as a first band, a second band, . . . , and a k-th band.

The integrating part 178 converts the plurality of pieces of divided frequency information into frequency information corresponding to one predetermined frequency band. The integrating part 178 converts, with the first band as the predetermined frequency band, for example, the plurality of pieces of divided frequency information into frequency information corresponding to the first band. In this case, the integrating part 178 subtracts $v_c$ from the frequency of the second band and shifts it toward the low frequency direction. In addition, the integrating part 178 subtracts $2 \times v_c$ from the frequency of the third band and shifts it toward the low frequency direction. In this manner, the integrating part 178 subtracts $(k-1) \times v_c$ from the frequency of the k-th band, and shifts the frequency, which is indicated by the k−1 pieces of frequency information, toward the low frequency direction. In this manner, the integrating part 178 converts the k pieces of frequency information into information corresponding to the first band.

Then, the integrating part 178 integrates the signal levels of the plurality of pieces of divided frequency information for each frequency. As a result, since a plurality of beat signals are integrated, the signal level at approximately the same frequency position ideally becomes the largest value. When noise or the like occurs, a random noise level is superimposed on such a beat signal. As the number k of bands to be integrated increases, such a noise component is smoothed to become an approximately constant value, and therefore the fluctuation of a peak frequency of the beat signal due to noise is suppressed.

The detection part 174 detects the frequency positions of the beat signals in the integrated frequency information. The detection part 174 detects, for example, a frequency position at which the signal level is maximized in the first band, and sets the detected frequency position as the frequency $v_B$ of the beat signal.

The distance calculation part 176 calculates the distance d from the measurement apparatus 100 to the object to be measured 10 on the basis of the frequency position $v_B$ of the detected beat signal. As described above, the measurement apparatus 100 can integrate the observation results of beat signals in a plurality of bands to average the noise components to be superimposed, thereby reducing the influence of noise. The measurement apparatus 100 of the Variation Example can also improve the throughput by shortening the measuring time.

The measurement apparatus 100 according to the present embodiment described above averages or superimposes the signal components on the basis of the plurality of observed beat signals to reduce the influence of noise, but the present embodiment is not limited to this. The measurement apparatus 100 may be configured to be switchable between (i) an operation in which averaging processing is not performed and (ii) an operation in which averaging processing is performed.

In this case, for example, the clock signal supplying part 210 is provided so as to switch the frequency of the clock signal to be supplied in response to user input or the like. The conversion part 160 is provided to be able to switch between the frequency analyzing part 220 and the frequency conversion part 310. Alternatively, the frequency analyzing part 220 may switch between a frequency analysis operation and a frequency conversion operation in response to the user input or the like. Similarly, the calculation part 170 switches between (i) the operation in which averaging processing is not performed and (ii) the operation in which averaging processing is performed in response to the user input or the like.

By doing this, the measurement apparatus 100 can switch processing in accordance to the measurement accuracy desired by the user or the like, and therefore can output the measurement result within an appropriate processing time. Further, the measurement apparatus 100 may be configured to be capable of switching the observation band in response to a user's request or the like. In this case, since the measurement apparatus 100 can vary the number k of beat signals for averaging, the processing can be set more finely according to the required measuring accuracy.

In the measurement apparatus 100 according to the present embodiment, the example has been described above in which the clock signal supplying part 210 supplies the clock signal having the frequency greater than or equal to four times the resonant frequency $v_c$ of the laser resonator to the first AD converter 202 and the second AD converter 204, but the present invention is not limited to this. For example, an external signal generation apparatus may supply a clock signal having the frequency greater than or equal to four times the resonant frequency $v_c$ of the laser resonator to the first AD converter 202 and the second AD converter 204 of the conversion part 160. Alternatively, the measurement apparatus 100 may generate a clock signal from the frequency-modulated laser beam output from the laser apparatus 110. Next, such a measurement apparatus 100 will be described.

Figure 10:
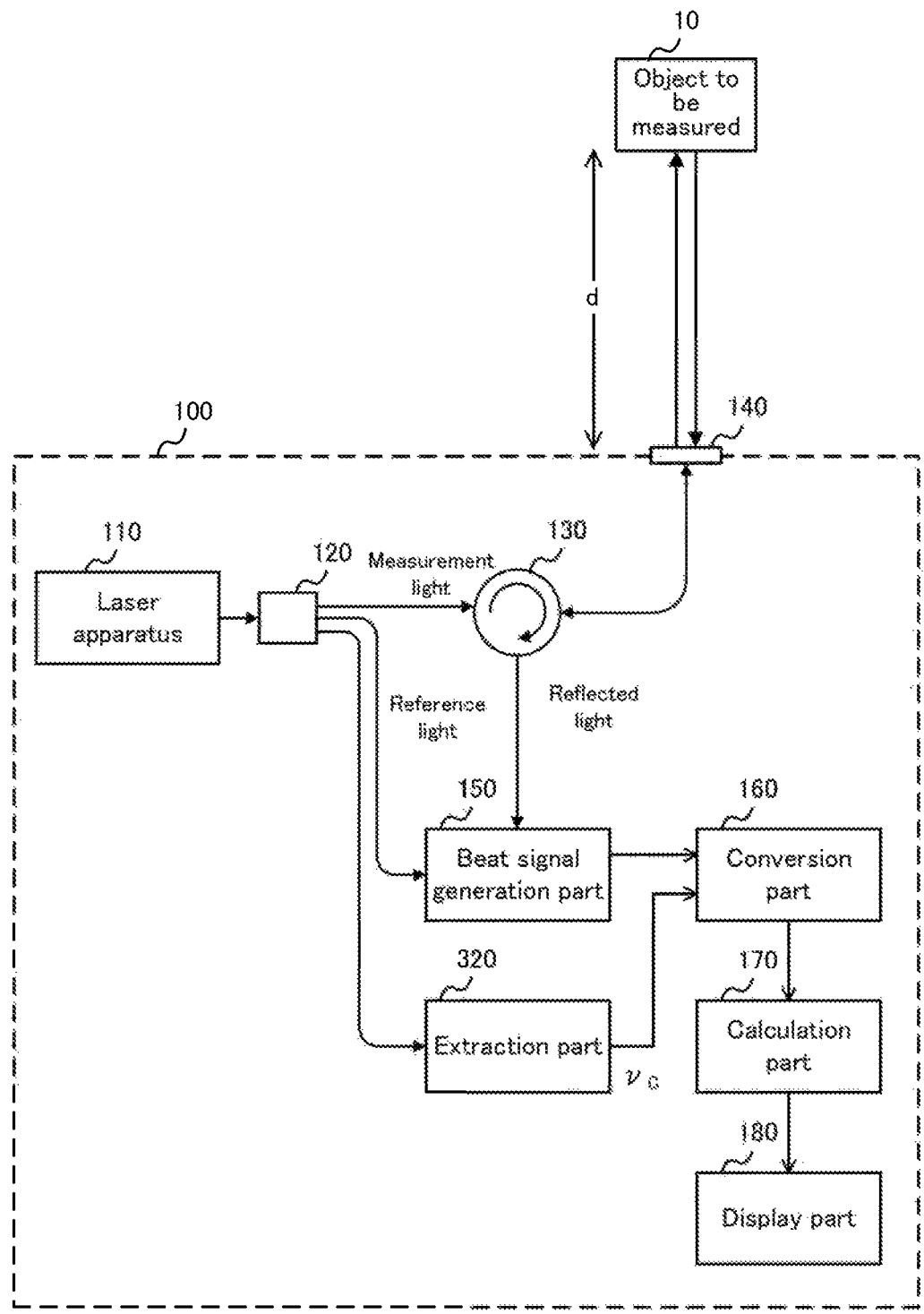
FIG. 10 shows a variation example of the measurement apparatus 100 according to the present embodiment together with the object to be measured 10.

FIG. 10 shows a variation example of the measurement apparatus 100 according to the present embodiment together with the object to be measured 10. In this case, the measurement apparatus 100 further includes an extraction part. In the measurement apparatus 100 according to the variation example, operations approximately the same as those of the measurement apparatus 100 according to the present embodiment shown in FIG. 1 are denoted by the same reference numerals, and the descriptions thereof are omitted. The measurement apparatus 100 further includes an extraction part 320.

As described in FIGS. 3 and 4, the laser apparatus 110 outputs the frequency-modulated laser beam having the frequencies of the plurality of longitudinal modes that are arranged at frequency intervals which approximately match the resonant frequency $v_c$. Therefore, the electronical signal, which is the frequency-modulated laser beam resulting from a photoelectric conversion, includes a signal component of the resonant frequency $v_c$. The extraction part 320 extracts the signal component superimposed on the frequency-modulated laser beam output from the laser apparatus 110 and corresponding to the resonator frequency $v_c$ of the laser resonator. It should be noted that the branching part 120 is, for example, a one-in-three-out fiber optic coupler. Alternatively, the branching part 120 may be a combination of two one-in-two-out optical couplers.

The extraction part 320 includes, for example, a photoelectric conversion part and a filter part. The photoelectric conversion part converts the frequency-modulated laser beam output from the laser apparatus 110 into an electronical signal. Among the electrical signals converted by the photoelectric conversion part, the filter part passes signal components having the resonator frequency $v_c$ of the laser resonator. The filter part has, for example, at least one of a high-pass filter, a low-pass filter, a band-pass filter, and a band-rejection filter. The extraction part supplies the extracted signal components having the resonator frequencies $v_C$ to the clock-signal supplying part 210.

In this case, the clock signal supplying part 210 generates a clock signal having a frequency greater than or equal to four times the resonant frequency $v_c$ of the laser resonator on the basis of the received signal components. The clock signal supplying part 210 may include a frequency multiplier, for example. Alternatively, the clock signal supplying part 210 may include a PLL circuit that uses a frequency of the received signal components as a reference frequency and outputs the frequency signal having a frequency greater than or equal to four times the reference frequency as a clock signal. As described above, when the measurement apparatus 100 generates the clock signal from the frequency-modulated laser beam output from the laser apparatus 110, the circuit including a frequency oscillator, or the like can be omitted, and therefore the configuration of the measurement apparatus 100 can be made simpler.

It is preferable that at least a part of the conversion part 160 and the calculation part 170 provided in the measurement apparatus 100 according to the present embodiment is formed by an integrated circuit or the like. At least a part of the conversion part 160 and the calculation part 170 includes, for example, a field programmable gate array (FPGA), a digital signal processor (DSP), and/or a central processing unit (CPU).

When at least a part of the conversion part 160 and the calculation part 170 is formed by a computer or the like, the part includes a storage unit and a control unit. The storage unit includes, for example, a read only memory (ROM) storing a basic input output system (BIOS) or the like of a computer or the like that realizes the conversion part 160 and the calculation pan 170, and a random access memory (RAM) serving as a work area. The storage unit may store an operating system (OS), programs, applications, and/or various pieces of information. The storage unit may include a large-capacity device like a hard disk drive (HDD) and/or a solid state drive (SSD).

The control unit is a processor such as a CPU, and functions as at least a part of the conversion part 160 and the calculation part 170 by executing programs stored in the storage unit. The control unit may include a graphics processing unit (GPU) or the like.

The present invention is explained on the basis of the exemplary embodiments. The technical scope of the present invention is not limited to the scope explained in the above embodiments and it is possible to make various changes and modifications within the scope of the invention. For example, all or part of the apparatus can be configured with any unit which is functionally or physically distributed or integrated. Further, new exemplary embodiments generated by arbitrary combinations of them are included in the exemplary embodiments of the present invention. Further, effects of the new embodiment brought by the combinations also have the effect of the original exemplary embodiment together.

What is claimed is:

1. A measurement apparatus for measuring a distance to an object to be measured, the measurement apparatus comprising:
    a laser apparatus that has a laser resonator and outputs a frequency-modulated laser beam with a plurality of modes;
    a branching part that branches a portion of the frequency-modulated laser beam output by the laser apparatus as a reference light and at least some of the remaining portion of the frequency-modulated laser beam as a measurement light;
    a beat signal generation part that generates a plurality of beat signals by mixing the reference light and a reflected light that is reflected by radiating the measurement light onto an object to be measured;
    a conversion part that converts the plurality of beat signals into digital signals by sampling the beat signals at a frequency greater than or equal to four times a resonator frequency of the laser resonator; and
    a calculation part that calculates a distance from the measurement apparatus to the object to be measured on the basis of the digital signals,
    wherein the conversion part includes a frequency conversion part that converts the digital signals into frequency information, and
    the calculation part includes:
        a dividing part that divides the frequency information converted by the frequency conversion part into a plurality of pieces of frequency information corresponding to a plurality of bands having a predetermined bandwidth;
        an integrating part that converts a plurality of pieces of divided frequency information into frequency information corresponding to one predetermined frequency band and then integrates signal levels for each frequency;
        a detection part that detects a frequency position of the beat signal of the integrated frequency information; and
        a distance calculation part that calculates the distance from the measurement apparatus to the object to be measured on the basis of the detected frequency position of the beat signal.

2. The measurement apparatus according to claim 1, wherein
the conversion part includes a frequency conversion part that converts the digital signals into frequency information, and the calculation part includes:
a dividing part that divides the frequency information converted by the frequency conversion part into frequency information corresponding to a plurality of bands having a predetermined bandwidth;
a detection part that detects a frequency position of a beat signal for each of a plurality of pieces of divided frequency information; and
a distance calculation part that calculates the distance from the measurement apparatus to the object to be measured on the basis of the detected frequency positions of the plurality of beat signals.

3. The measurement apparatus according to claim 2, wherein the distance calculation part respectively calculates distances from the measurement apparatus to the object to be measured corresponding to the frequency positions of the plurality of beat signals, and averages a plurality of the calculated distances.

4. The measurement apparatus according to claim 2, wherein the distance calculation part converts corresponding frequency positions of the plurality of beat signals, averages the converted frequency positions, and calculates a distance from the measurement apparatus to the object to be measured corresponding to the averaged frequency positions.

5. The measurement apparatus according to claim 1, wherein the dividing part sets the predetermined bandwidth to a bandwidth vc which is the same as the resonator frequency, and
the integrating part sets a first band from the lowest frequency of the plurality of pieces of divided frequency information to the one corresponding frequency band, shifts k−1 pieces of frequency information toward the lower frequency direction to convert to frequency information of the first band by subtracting (k−1)×vc from a frequency of a k-th band, and then integrates signal levels for each frequency, the k-th band being a subsequent k-th band after the first band.

6. The measurement apparatus according to claim 2, wherein the dividing part sets the predetermined bandwidth to a bandwidth equal to or less than the resonator frequency.

7. The measurement apparatus according to claim 1 further comprising:
an extraction part that extracts a signal component superimposed on the frequency-modulated laser beam output from the laser apparatus and corresponding to the resonator frequency of the laser resonator, wherein the conversion part further includes a clock signal supplying part that generates a clock signal having the frequency greater than or equal to four times the resonant frequency of the laser resonator on the basis of the signal component.

8. The measurement apparatus according to claim 7, wherein the clock signal supplying part includes a PLL circuit that uses a frequency of the signal component as a reference frequency and outputs a frequency signal having a frequency greater than or equal to four times the reference frequency as a clock signal.

9. A measurement method of a measurement apparatus for measuring a distance to an object to be measured, the method comprising:
outputting a frequency-modulated laser beam with a plurality of modes from a laser apparatus having a laser resonator;
branching a portion of the frequency-modulated laser beam as a reference light and at least some of the remaining portion of the frequency-modulated laser beam as a measurement light;
generating a plurality of beat signals by mixing the reference light and a reflected light that is reflected by radiating the measurement light onto an object to be measured;
converting the plurality of beat signals into digital signals by sampling the beat signals at a frequency greater than or equal to four times a resonator frequency of the laser resonator; and
calculating a distance from the measurement apparatus to the object to be measured on the basis of the digital signals,
wherein the converting includes a frequency converting that converts the digital signals into frequency information, and
the calculating further includes:
dividing the frequency information converted by the frequency converting into a plurality of pieces of frequency information corresponding to a plurality of bands having a predetermined bandwidth,
converting a plurality of pieces of divided frequency information into frequency information corresponding to one predetermined frequency band and then integrating signal levels for each frequency,
detecting a frequency position of the beat signal of the integrated frequency information, and
calculating the distance from the measurement apparatus to the object to be measured on the basis of the detected frequency position of the beat signal.

10. A measurement apparatus for measuring a distance to an object to be measured, the measurement apparatus comprising:
a laser that has a laser resonator and outputs a frequency-modulated laser beam with a plurality of modes;
a branch that branches a portion of the frequency-modulated laser beam output by the laser as a reference light and at least some of the remaining portion of the frequency-modulated laser beam as a measurement light;
beat signal generator that generates a plurality of beat signals by mixing the reference light and a reflected light that is reflected by radiating the measurement light onto an object to be measured;
convertor circuitry that converts the plurality of beat signals into digital signals by sampling the beat signals at a frequency greater than or equal to four times a resonator frequency of the laser resonator; and
calculation circuitry configured to calculate a distance from the measurement apparatus to the object to be measured on the basis of the digital signals,
wherein the convertor circuitry includes a frequency conversion circuitry that converts the digital signals into frequency information, and
the calculation circuitry is further configured to:
divide the frequency information converted by the frequency conversion circuitry into a plurality of pieces of frequency information corresponding to a plurality of bands having a predetermined bandwidth,
convert a plurality of pieces of divided frequency information into frequency information corresponding to one predetermined frequency band and then integrate signal levels for each frequency, detect a frequency position of the beat signal of the integrated frequency information, and calculate the distance from the measurement apparatus to the object to be measured on the basis of the detected frequency position of the beat signal.

* * * * *